W. E. ALEXANDER.
MANURE SPREADER.
APPLICATION FILED DEC. 19, 1911.

1,038,814.

Patented Sept. 17, 1912.

3 SHEETS—SHEET 1.

WITNESSES:
J. H. Gardner.
M. M. Wilkerson.

INVENTOR:
William E. Alexander,
BY
E. D. Silvius,
ATTORNEY.

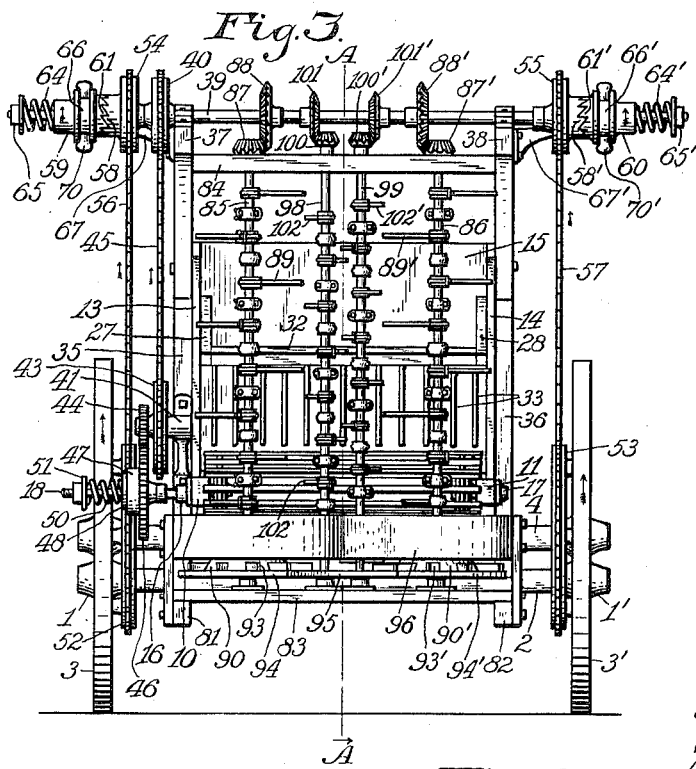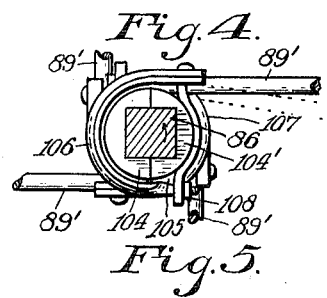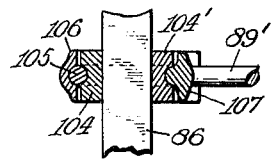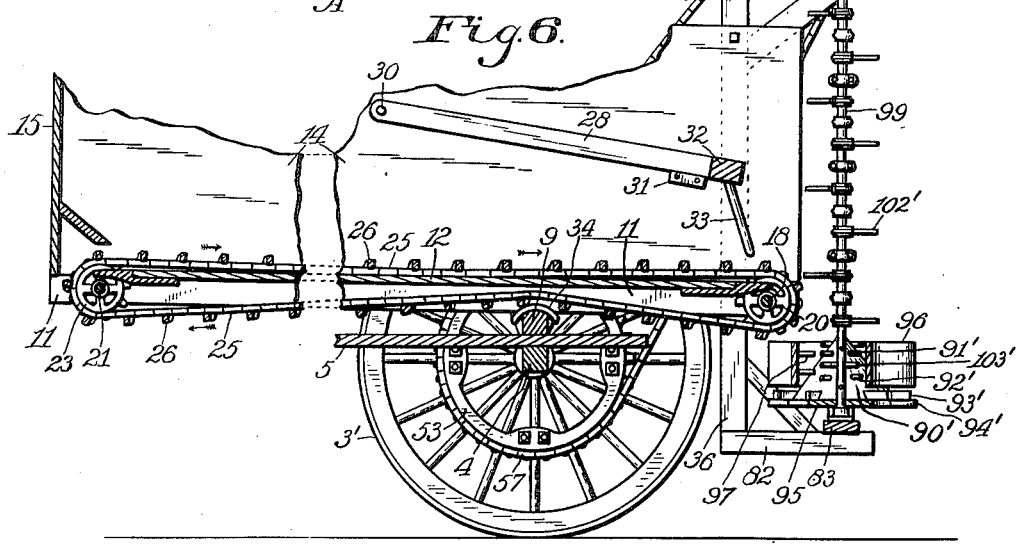

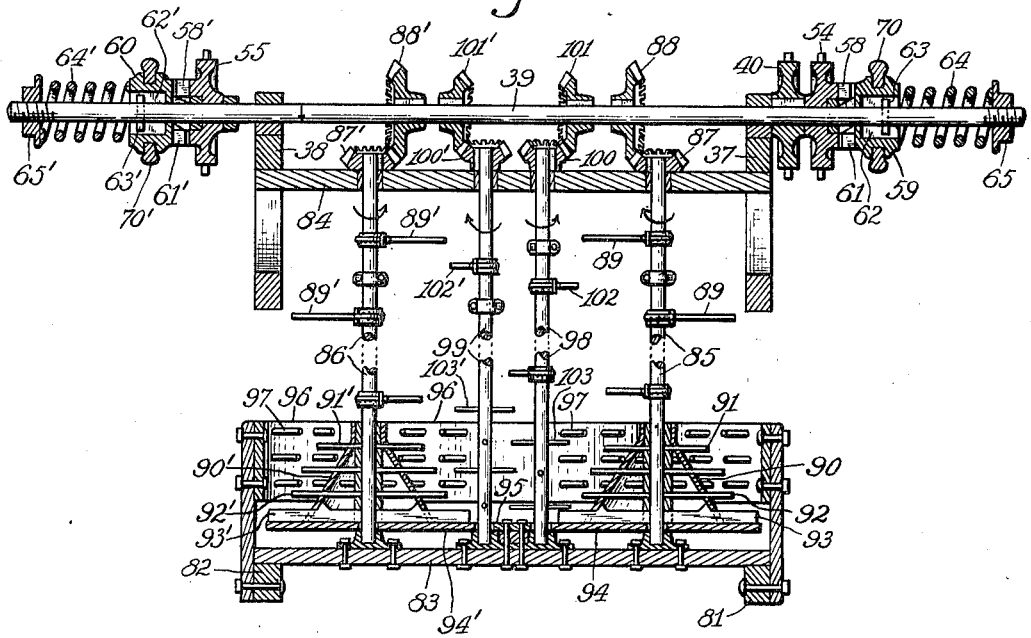

UNITED STATES PATENT OFFICE.

WILLIAM E. ALEXANDER, OF JEFFERSON TOWNSHIP, BOONE COUNTY, INDIANA.

MANURE-SPREADER.

1,038,814.  Specification of Letters Patent.  Patented Sept. 17, 1912.

Application filed December 19, 1911. Serial No. 666,811.

*To all whom it may concern:*

Be it known that I, WILLIAM E. ALEXANDER, a citizen of the United States, residing in Jefferson township, in the county of Boone and State of Indiana, have invented a new and useful Manure-Spreader, of which the following is a specification, reference being had to the accompanying drawings and to the letters and figures of reference marked thereon.

This invention relates to farm implements and has reference particularly to a machine for spreading fertilizing substance such as manure or compost on the ground, especially as a top dressing.

The object of the invention primarily is to provide an improved machine for hauling manure to the fields and discharging it evenly onto the ground, a further object being to provide a manure spreader that will be capable of breaking up and scattering lumpy fertilizing matter in small particles; a still further object being to provide a machine of the above mentioned character that shall be so constructed as to be enabled to spread the manure over a broader strip of land than that of the width of the vehicle that hauls the fertilizer, in order to reduce the number of trips across the field to the minimum.

Another object of the invention is to provide a combined farm wagon and manure spreader that shall comprise manure spreading apparatus so mounted on a wagon as to be removable, to permit the wagon to be used for general hauling purposes during seasons of the year when not required for spreading fertilizers; which machine shall be so constructed as to be adapted to be repaired in rural districts, and be durable and economical in use.

With the above mentioned and minor objects in view, the invention consists in an improved manure spreader comprising essentially a wheeled vehicle provided with feeding apparatus for moving manure to the rear end of the vehicle, one or more shafts rotatably mounted uprightly at the rear end of the vehicle and provided with fingers for scattering the manure behind the vehicle and also laterally beyond the track of the vehicle; the machine preferably comprising also means for pulverizing lumpy matter and scattering it with the naturally smaller particles of the fertilizer.

The invention consists also in the novel parts and combinations and arrangements of parts as hereinafter particularly described and pointed out in the accompanying claims.

Figure 1:
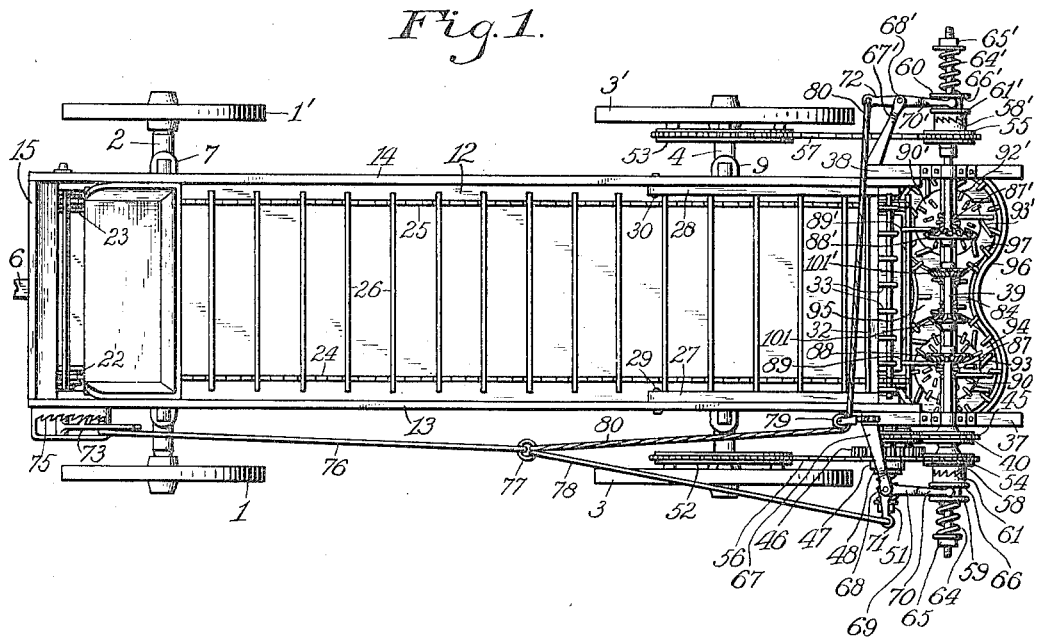
Figure 2:
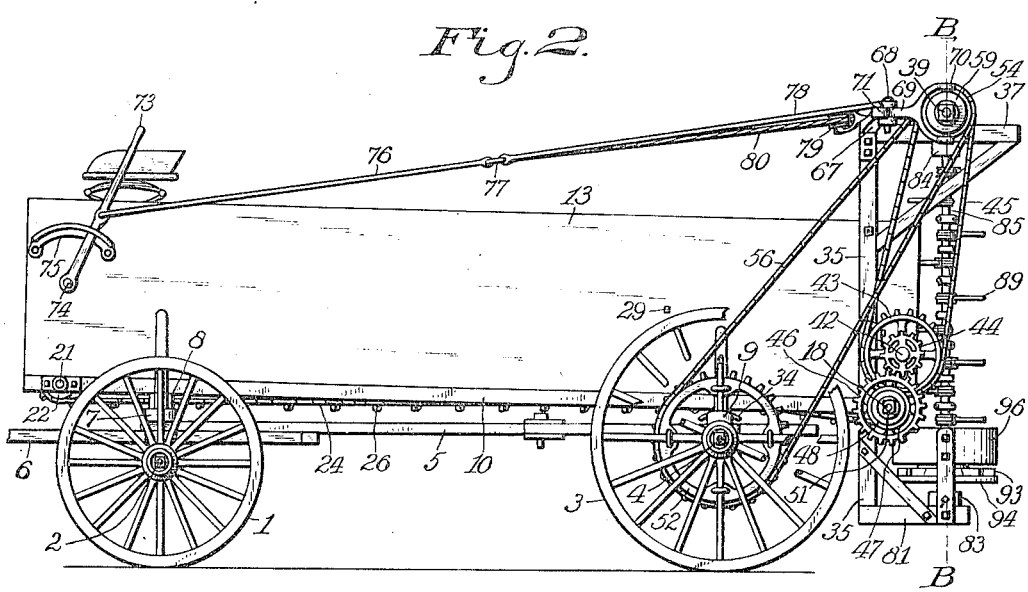

Referring to the drawings, Figure 1 is a top plan of the improved manure spreader as preferably constructed; Fig. 2, a side elevation of the machine partially broken away; Fig. 3, a rear elevation of the machine; Fig. 4, a horizontal section showing portions of the spreading devices; Fig. 5, a fragmentary vertical section of the devices shown in the preceding figure; Fig. 6, a fragmentary section on the plane of the line A A in Fig. 3; Fig. 7, a fragmentary section on the plane of the line B B in Fig. 2; Fig. 8, a fragmentary side elevation showing portions of Fig. 2 on an enlarged scale; and Fig. 9, a fragmentary vertical section on the planes of the line C C in Fig. 8.

Similar reference characters in the different figures of the drawings indicate corresponding elements or features of construction herein referred to and described.

The wagon constituting the vehicle for carrying the fertilizer may be variously constructed in detail, and preferably it comprises two forward wheels 1 and 1' mounted on a front guiding axle 2, rear wheels 3 and 3' mounted on a rear axle 4, a coupling pole 5, a guiding tongue 6, a front bolster 7 preferably having filling blocks 8 on the end portions thereof, and a rear bolster 9 comprising the running gear of the wagon. The wagon bed or body comprises two frame rails 10 and 11 supported on the blocks 8 and the rear bolster 9, it being preferable that the forward end of the bed be slightly higher than the rear end thereof, a bottom 12 supported on the rails, two side boards 13 and 14 and a front board 15 supported also on the rails in connection with the bottom. The rear end portions of the rails 10 and 11 are provided respectively with journal boxes 16 and 17 in which a shaft 18 is rotatably mounted, the shaft extending outward beyond one of the journal boxes and it has two sprocket wheels 19 and 20 secured thereto at the inner sides of the journal boxes, being at the rear end of the floor 12. A shaft 21 is rotatably supported by the forward end portions of the rails 10 and 11 and it has two sprocket wheels 22 and 23 secured thereto. A sprocket chain 24 is mounted on the wheels 19 and 22, and a similar chain 25 is mounted on the wheels 20 and 23, so that the chains extend upon the top and under the floor, being driven by the wheels 19 and 20, and a suitable number of slats or flights 26 are connected to the chains so as to be drawn rearward over the floor to feed the manure to the spreading machinery. Suitable means is provided for preventing the manure from falling too freely from the rear end of the wagon bed, and may suitably comprise two arms 27 and 28 connected by means of two pivots 29 and 30 to the inner sides of the side boards 13 and 14 respectively and extending rearward, the free ends of the arms resting on stops 31 secured to the side boards, when the wagon is empty, a cross bar 32 being secured to the free ends of the arms and having a suitable number of fingers 33 secured thereto. The arms are raised when the wagon is loaded so that the cross bar rests upon the top of the manure and tends to pack it, while the fingers prevent the uppermost particles of the manure from falling out of the open rear end of the body. Preferably the top of the bolster 9 has a curved guide 34 thereon for guiding the sprocket chains and slats over the bolster, the chains passing between the blocks 8 and over the front bolster 7. It is obvious that the feeding apparatus may if desired be removed from the wagon bed so that the wagon may be used for various purposes.

The principal mechanism of the spreading or scattering apparatus is mounted on a unitary frame that is secured to the wagon bed so that the frame and machinery may readily be removed from the wagon if desired. The frame preferably comprises two standards 35 and 36, that are suitably secured to the outer sides of the rails 10 and 11 and the side boards 13 and 14 respectively, and two suitably braced horizontal arms 37 and 38 on the upper portions of the standards respectively, the frame comprising also other parts as may be desired. A driving shaft 39 is rotatably mounted horizontally upon the arms 37 and 38 and has a sprocket wheel 40 secured thereto adjacent the outer side of the arm 37, the shaft being sufficiently long to extend outwardly beyond the arms. A bracket 41 is mounted on the standard 35 and supports a stub-axle 42 on which a sprocket wheel 43 is rotatably mounted, the sprocket wheel carrying a pinion 44 on its outer side. The sprocket wheel 43 is considerably larger than the wheel 40 in diameter, and the two sprocket wheels are connected by means of a sprocket chain 45. The pinion 44 is less in diameter than the wheel 43, and it is in contact with a relatively large gear wheel 46 that is rotatably mounted on the shaft 18, the wheel 46 being provided with a friction clutch member 47 adapted to be in slipping engagement with a suitable clutch member 48 that is slidingly mounted also on the shaft 18 and prevented from rotating on the shaft by means of a spline 49, a spring 50 being placed on the shaft and seated at one end against the clutch member 48 to normally hold it in contact with the clutch member 47, the opposite end of the spring being seated against a nut 51 screwed on the end portion of the shaft 18 whereby the tension of the spring may be varied. Two large sprocket wheels 52 and 53 are secured to the rear wheels 3 3' respectively, for driving the spreading machinery and the feeding apparatus. Two sprocket wheels 54 and 55 are rotatably mounted on the shaft 39 and are connected with the wheels 52 and 53 by means of sprocket chains 56 and 57 respectively. It will be seen that when the shaft 39 is rotated the sprocket chain 45 is driven so that the gear wheel 46 must rotate and it in turn ordinarily rotates the shaft 18, for driving the feeding apparatus, but in case the feeding apparatus is overloaded or becomes clogged in any way so as to be liable to break the gearing, the clutch member 47 may slip in contact with the clutch member 48 and avoid breakage until the trouble can be removed.

In order to enable the moving wagon to drive the shaft 39 the outer sides of the sprocket wheels 54 and 55 are provided with ratchet teeth 58 and 58' respectively. Two clutch members 59 and 60 being slidingly mounted on the shaft 39 and provided with oppositely facing ratchet teeth 61 and 61', said members having recesses 62 and 62' therein receiving pins or splines 63 and 63' respectively that are secured to the shaft 39, so that when the wagon is moving forward the wheels 54 and 55 shall rotate the shaft while permitting either wheel 54 or 55 to rotate backward without turning the shaft, as in case the wagon is turning and one of the rear wheels thereof is rolling backward. Two coil springs 64 and 64' are placed on the shaft 39 and seated against the clutch members 59 and 60 respectively, and also against two nuts 65 and 65' screwed on the opposite end portions of the shaft, for holding the ratchet teeth of the clutch members in contact with the ratchet teeth of the sprocket wheels. In order to withdraw the clutch members 59 and 60 from the sprocket wheels 54 and 55 respectively, so as to stop the operation of the machinery while the wagon moves from place to place, suitable provision is made, the members 59 and 60 preferably having grooves 66 and 66' therein respectively, the machinery frame having two brackets 67 and 67' thereon provided with pivots 68 and 68' respectively. A bell crank is connected to the pivot 68 and one arm 69 thereof has a fork 70 that extends into the groove 66, the other arm 71 of the bell crank extending outwardly approximately parallel to the shaft 39. A lever 72 is connected between its ends with the pivot 68' and it has a fork 70' extending into the groove 66'. A lever 73 is connected by means of a pivot 74 with the forward portion of the side board 13 and extends upwardly into working engagement with a notched quadrant 75, a pull rod 76 being connected to the lever and provided with a link 77 to which a rod 78 is connected, the latter rod being connected to the arm 71 of the bell crank. A guide pulley 79 is mounted on the frame adjacently to the bracket 67, and guides a cable 80 which is connected to the link 77 and also to the lever 72.

The standards 35 and 36 which, as will be seen, extend downward beyond the plane of the rails 10 and 11, have two suitably braced arms 81 and 82 on the lower portions thereof respectively, and they extend rearward horizontally and support a transverse beam 83, and a transverse beam 84 is secured to the upper arms 37 and 38 above the beam 83. Two spreader shafts 85 and 86 are rotatably mounted upon the beam 83 and in the beam 84 and have pinions 87 and 87' secured to the upper ends thereof respectively, the shafts being below the driving shaft 39, and two bevel gear wheels 88 and 88' are secured fixedly to the shaft 39 and face outwardly, being in contact with the pinions 87 and 87' respectively. The shafts 85 and 86 are provided with a suitable number of fingers 89 and 89' respectively for unloading and spreading or scattering the manure. There are a large number of fingers on each shaft, and as the shafts rotate rapidly the fingers rake the manure from the rear end of the wagon body. In order to guard against the unloading of large lumps the lower portions of the shafts 85 and 86, which preferably serve as crusher shafts, have conical crusher bases 90 and 90' thereon respectively, from which fingers 91 and 91' extend, the fingers projecting uniform distances from the surface of the bases so that the lowermost fingers 92 and 92' extend farther from the axes of the shafts than the upper ones. The lower portions of the bases have projecting blades 93 and 93' thereon respectively for throwing off the matter that gravitates thereto, the matter being prevented from falling directly downward to the ground by means of base plates 94 and 94' which are arranged immediately beneath the blades, being preferably carried by the conical bases as illustrated, but obviously may be supported in a stationary manner beneath the blades if desired, and preferably a stationary floor plate 95 is suitably supported on the beam 83 between the plates 94 and 94'. It should be understood, however, that the proportions of the plates 94 and 94' may be such as to obviate the necessity or desirability of the floor plate. The direction of motion of the shafts 85 and 86 is such that the fingers 89 and 89' while raking the substance from the wagon bed first draw the substance toward a plane midway between the upright shafts, and it is desirable to interpose an upright breaker midway between the shafts against which to break up the lumpy matter to some extent. The heavier lumps descend by force of gravity toward the ground and are pulverized between the conical bases and the inner side of an upright casing 96 extending about the two conical bases and suitably supported upon the arms 81 and 82 and otherwise as may be desired, the casing being provided with a suitable number of teeth 97 projecting inwardly for assisting in the pulverizing operation. The lower end of the casing is slightly above the plane of the tops of the blades 93 and 93' so that the blades may throw the pulverized manure freely outward under the casing.

The breaker above referred to preferably is active and comprises two breaker or beater shafts 98 and 99 rotatably mounted uprightly relatively close together on the beam 83 and in the beam 84 and so as to extend through the floor 95, the shafts 85 and 86 being separated sufficiently to admit the floor between the plates 94 and 94'. The upper portions of the shafts 98 and 99 have bevel pinions 100 and 100' secured thereto respectively, and they are driven by two bevel gear wheels 101 and 101' respectively which are arranged face to face on the shaft 39 and secured thereto. The arrangement is such, as will be seen, that while the fingers 89 and 89' draw manure from the wagon toward the breaker shafts, the latter being provided with beater fingers 102 and 102' respectively, throw the manure outward in the opposite directions, so that the substance is rapidly agitated and considerably broken up while being scattered rearwardly and laterally. The lower portions of the shafts 98 and 99 are provided with fingers 103 and 103' respectively that coöperate with the teeth 97 and the fingers on the conical bases of the spreader or crusher shafts, and they may be somewhat shorter than the fingers 102 and 102'. Preferably all the fingers on the upper portions of all the upright shafts are suitably formed as spring-fingers so that they will not be liable to break but may yield in passing obstructions such as frozen lumps of manure or stones that may be embedded in the load. Each finger, as shown more clearly in Figs. 4 and 5, may suitably be connected to two blocks 104 and 104′ embracing the shaft, and in this arrangement, the shaft preferably being squared, the finger, as 89′ has an end portion 105 turned partially about the blocks and secured thereto by means of a clip 106 and a connected clamp bar 107 which is secured by a nut 108 screwed onto the clip.

In practical use the load in the wagon body is slowly moved or fed rearward to the upright spreaders and to the breakers, the latter preferably being in motion but obviously may be stationary if preferred, and the shafts being driven at high speed, the fingers rake the manure from the wagon bed and forcibly throw it rearwardly and outwardly so that it is thoroughly spread or scattered, the heavier lumpy particles gravitating into the casing 96 and after being crushed therein are thoroughly scattered onto the ground.

Other results and advantages of the operation of the machine will be readily understood from the foregoing description of the mechanism and function thereof without further reference thereto.

Having thus described the invention, what is claimed as new is:—

1. A manure spreader including a wagon provided with movably mounted spreading devices, stationary crushing devices, and movable conical toothed crushing apparatus operatively connected with the spreading devices and coöperating with the stationary crushing devices.

2. A manure spreader including a wagon provided with a plurality of upright rotable shafts and also a breaker device supported uprightly between the shafts in one and the same plane with the shafts, each shaft having a plurality of fingers thereon, and a driving shaft rotatably mounted horizontally above the upright shafts and connected therewith.

3. A manure spreader including a wagon, an approximately horizontal feeder mounted in the wagon, scattering apparatus comprising rotatable finger-equipped shafts uprightly mounted above the plane of the feeder, a rotatable driving shaft mounted above the upright shafts and connected therewith, crushing apparatus mounted below the plane of the feeder, and rotary scattering apparatus mounted in a plane below the crushing apparatus.

4. A manure spreader including a plurality of upright rotatable shafts, each shaft having a conical base thereon provided with blades and also fingers, each shaft having also a plurality of spreader fingers thereon above the conical bases, a casing supported above the plane of the blades and extending about the conical bases, the inner side of the casing having teeth thereon, and a driving shaft connected with the rotatable shafts.

5. A manure spreader including a wagon provided with movably mounted spreading devices, stationary crushing devices supported in a plane below the spreading devices, movable crushing apparatus operatively connected with the spreading devices and coöperating with the stationary crushing devices, and spreading apparatus movably mounted in a plane below the stationary crushing devices and operatively connected with the movable crushing apparatus.

6. In a manure spreader, the combination with horizontally movable feeding apparatus, of a spreader shaft rotatably supported vertically adjacent the feeding apparatus and having blocks detachably secured thereto, spring-fingers detachably secured to the blocks respectively, a driving shaft rotatably supported above and operatively connected with the spreader shaft, and gearing operatively connecting the feeding apparatus with the driving shaft.

7. In a manure spreader, the combination with a wheel-supported wagon bed, feeding apparatus in the bed movable toward the end thereof, and a frame mounted on the end of the bed, of a plurality of spreader shafts rotatably mounted uprightly in the frame, each shaft having pulverizing devices on the lower portion and spreader fingers on the upper portion thereof, a casing mounted on the frame and extending about the pulverizing devices of the shafts, and a driving shaft rotatably mounted on the frame and connected with the spreader shafts.

8. In a manure spreader, the combination with a wheel-supported wagon bed, feeding apparatus in the bed movable toward the end thereof, a frame mounted on the end of the bed, and a driving shaft rotatably mounted horizontally on the frame, of a plurality of spreader shafts rotatably mounted uprightly on the frame and extending downward beyond the plane of the feeding apparatus, each shaft having projecting blades on the lower portion thereof and fingers in different planes above the blades, base plates supported beneath the blades, a casing supported by the frame and extending about the lower portion of the spreader shafts above the plane of the blades, and gearing connecting the spreader shafts with the driving shaft.

9. In a manure spreader, the combination of an upright rotatable shaft having a conical base thereon, projecting blades carried by the lower portion of the base, a base plate beneath the blades, projecting fingers on the conical base, and fingers carried by the shaft above the base, with a casing extending about the conical base above the plane of the blades, and feeding apparatus movable toward the shaft.

10. In a manure spreader, the combination of two upright spreader shafts rotatably supported, each shaft having a plurality of fingers thereon, and a driving shaft rotatably mounted horizontally above the spreader shafts and operatively connected therewith, with a breaker device uprightly mounted in a plane between the two spreader shafts, a casing extending about the lower portions of the spreader shafts and the breaker device, and feeding apparatus movable toward the two spreader shafts and the breaker device.

11. In a manure spreader, the combination with a wagon bed, and movable feeding means in the bed for moving manure horizontally to one end of the bed, of two spreader shafts rotatably supported at the end of the bed and having fingers thereon for scattering the manure, a breaker device supported in a plane between the two shafts, and crushing and spreading means supported below the plane of the feeding means.

12. In a manure spreader, the combination with a horizontally arranged movable feeder, of a plurality of spreader shafts and also breaker-shafts rotatably supported uprightly adjacent the feeder, each shaft having a plurality of fingers connected directly thereto, a driving shaft rotatably supported adjacent the upper ends of the spreader and breaker shafts, gearing enabling the driving shaft to rotate the spreader shafts and the breaker shafts, and gearing operatively connecting the feeder with the driving shaft.

13. In a manure spreader, the combination with horizontally arranged movable feeding apparatus, of a driving shaft rotatably supported horizontally, two spreader shafts rotatably mounted uprightly adjacent the feeding apparatus and operatively connected with the driving shaft, fingers carried by the spreader shafts, a beater shaft supported uprightly between the two spreader shafts, a base plate supported at the lower ends of the spreader shafts, blades carried by the spreader shafts above the base plates, and a casing extending about the spreader shafts and supported above the plane of the base plates.

14. In a manure spreader, the combination with horizontally arranged movable feeding apparatus, of a driving shaft rotatably mounted horizontally above the plane of the feeding apparatus, two spreader shafts rotatably mounted uprightly adjacent the feeding apparatus and operatively connected with the driving shaft, fingers carried by the spreader shafts, two beater shafts rotatably mounted uprightly between the two spreader shafts and operatively connected with the driving shaft, and fingers carried by the beater shafts.

15. In a manure spreader, the combination with horizontally arranged movable feeding apparatus, of a driving shaft rotatably mounted horizontally above the plane of the feeding apparatus, two spreader shafts rotatably mounted uprightly adjacent the feeding apparatus, gearing connecting the upper ends of the spreader shafts with the driving shaft, fingers detachably connected to the spreader shafts, base plates extending about the lower portions of the spreader shafts, and a casing supported above the plane of the base plates and extending about the two spreader shafts, the inner side of the casing having projections thereon.

16. In a manure spreader, the combination of two upright rotatable shafts, each shaft having a conical base thereon, fingers on the bases, fingers carried by the shafts above the bases, blades carried by the bases, base plates extending about the shafts beneath the blades, a floor plate supported between the base plates, two breaker shafts having fingers thereon and rotatably supported uprightly between the two upright shafts, fingers on the breaker shafts in proximity to said floor, a driving shaft operatively connected with all of said upright shafts, and a casing extending about said bases and having teeth on the inner side thereof.

17. In a manure spreader, the combination with a wagon bed, and feeding means movably mounted in the bed, of a frame supported at one end of the bed and having two beams in different horizontal planes, a driving shaft rotatably mounted on the frame above the uppermost one of the beams, two bevel gear wheels on the shaft, two spreader shafts rotatably mounted in the uppermost beam and upon the lowermost beam and having each a bevel pinion thereon meshing with the bevel gear wheels respectively, base plates carried by the spreader shafts at their lower ends, and fingers carried by the spreader shafts above the base plates.

18. In a manure spreader, the combination with a wagon having two rear wheels, two sprocket wheels carried by the two rear wheels respectively, and a frame mounted on the wagon in proximity to the rear wheels, of a driving shaft rotatably mounted on the upper portion of the frame, a plurality of spreader shafts rotatably mounted uprightly in the frame and operatively connected with the driving shaft, fingers on the spreader shafts, two sprocket wheels rotatable on the driving shaft and provided each with ratchet teeth, a sprocket chain connected with one of the sprocket wheels on the driving shaft and the sprocket wheel on one of the rear wheels, a sprocket chain connected with the remaining one of the sprocket wheels on the driving shaft and the sprocket wheel on the remaining one of the rear wheels, two clutch members splined on the driving shaft having ratchet teeth normally in contact with the teeth of the sprocket wheels respectively, springs on the driving shaft projecting the clutch members, and means for retracting the clutch members.

In testimony whereof, I affix my signature in presence of two witnesses.

WILLIAM E. ALEXANDER.

Witnesses:
A. J. SHELBY,
ZENTA V. PAVEY.